(12) United States Patent
Bach

(10) Patent No.: US 12,531,093 B2
(45) Date of Patent: Jan. 20, 2026

(54) TECHNIQUES TO CONFIGURE DRIVERS

(71) Applicant: Micron Technology, Inc., Boise, ID (US)

(72) Inventor: Martin Bach, Munich (DE)

(73) Assignee: Micron Technology, Inc., Boise, ID (US)

( * ) Notice: Subject to any disclaimer, the term of this patent is extended or adjusted under 35 U.S.C. 154(b) by 111 days.

(21) Appl. No.: 18/597,576

(22) Filed: Mar. 6, 2024

(65) Prior Publication Data

US 2024/0304227 A1 Sep. 12, 2024

Related U.S. Application Data

(60) Provisional application No. 63/489,593, filed on Mar. 10, 2023.

(51) Int. Cl.
*G11C 7/06* (2006.01)
*G11C 7/10* (2006.01)
*G11C 7/14* (2006.01)
*H03K 19/017* (2006.01)

(52) U.S. Cl.
CPC ............... *G11C 7/106* (2013.01); *G11C 7/14* (2013.01); *H03K 19/01742* (2013.01)

(58) Field of Classification Search
CPC ..................................................... G11C 7/062
See application file for complete search history.

(56) References Cited

U.S. PATENT DOCUMENTS

2017/0179953 A1* 6/2017 Hardee .......... H03K 19/017581

\* cited by examiner

*Primary Examiner* — Hoai V Ho
(74) *Attorney, Agent, or Firm* — Holland & Hart LLP

(57) ABSTRACT

Methods, systems, and devices for techniques to configure drivers are described. A memory device may calibrate a set of drivers at multiple reference voltages corresponding to different signal values of the drivers. In some examples, a driver associated with transmitting data may include an inductor and the memory device may include a calibration circuit to identify one or more configurations for a set of pull-up circuits and a set of pull-down circuits of the driver both with and without the inductor. The calibration circuit may compare an output of a first pull-up circuit isolated from the inductor with one or more reference voltages, compare an output of a second pull-up circuit coupled with the inductor with the one or more reference voltages, and compare an output of a pull-down circuit isolated from the inductor to the one or more reference voltages.

20 Claims, 6 Drawing Sheets

TECHNIQUES TO CONFIGURE DRIVERS

CROSS REFERENCE

The present Application for Patent claims priority to and the benefit of U.S. Provisional Application No. 63/489,593 by Bach, entitled "TECHNIQUES TO CONFIGURE DRIVERS," filed Mar. 10, 2023, assigned to the assignee hereof, and is expressly incorporated by reference in its entirety herein.

TECHNICAL FIELD

The following relates to one or more systems for memory, including techniques to configure drivers.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
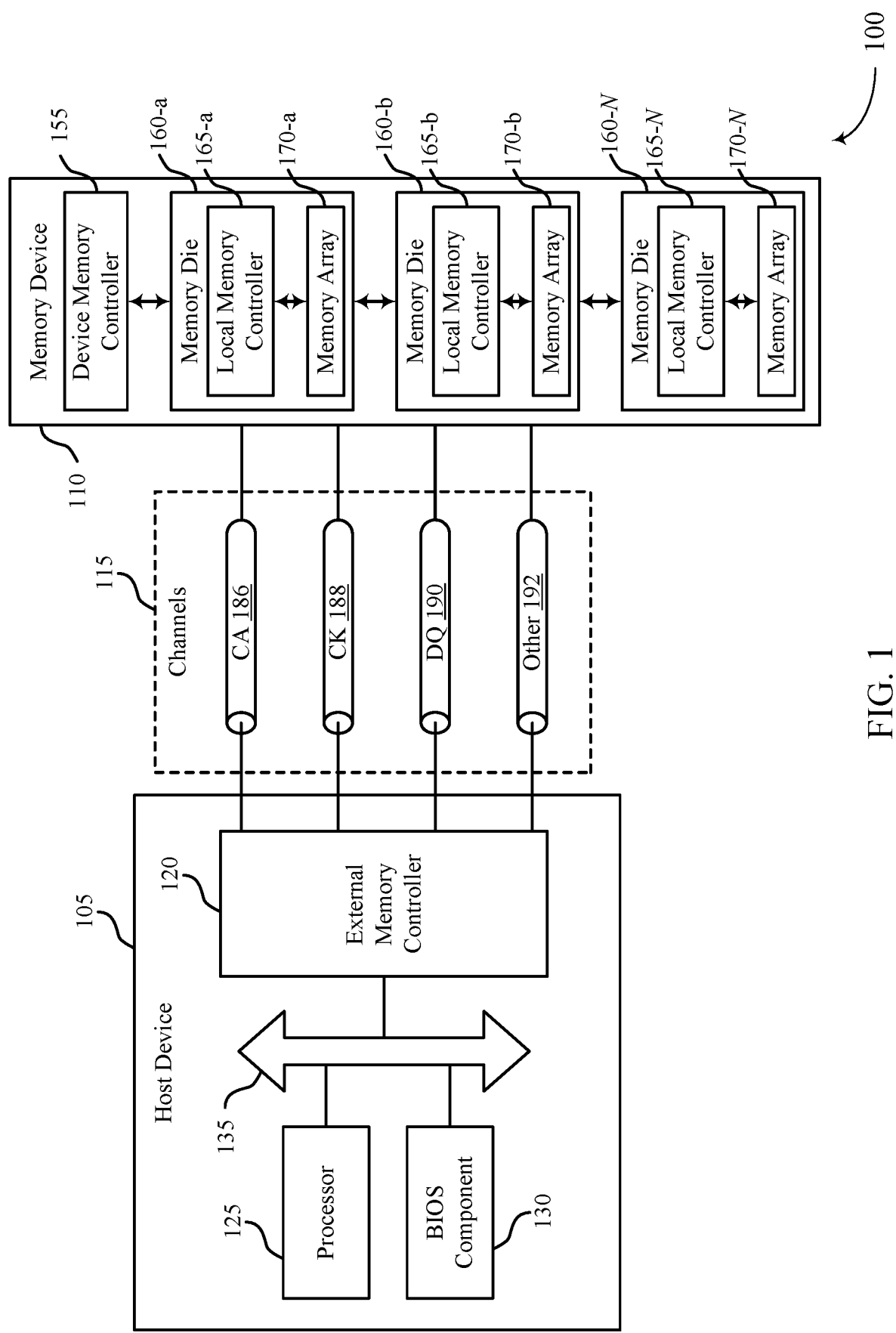
FIG. 1 illustrates an example of a system that supports techniques to configure drivers in accordance with examples as disclosed herein.

In some signaling applications, a signaling device, such as a 3-level pulse amplitude modulation (PAM3) device, may be configured to transmit multiple signal values. Such multi-level signaling devices and techniques may use a reduced voltage margin between different transmitted signal values, relative to a binary signaling, such as a PAM2 signaling or non-return-to-zero (NRZ) signaling. In some cases, a driver of a multi-level signaling may include components (e.g., resistors, inductors, impedances, and the like), which may result in a non-linear impedance of the driver, which may lead to the driver transmitting inaccurate signal values. While increasing the linearity of the driver (e.g., reducing the non-linearity of the driver) may increase signal accuracy, doing so may increase pin capacitance (e.g., parasitic capacitance) between components of the driver, which may reduce performance (e.g., speed) of the driver. Additionally, some multi-level signaling devices may include one or more inductor circuits, such as telecoils, which may improve performance, but may also affect the overall impedance and performance of the driver.

As described herein, a memory device may calibrate a set of drivers at multiple reference voltages corresponding to different signal values (e.g., voltages) of the drivers. In some examples, drivers may include different circuitry for transmitting signals associated with data and signals associated with control information, such as commands, addresses, or both. For example, a driver associated with transmitting data may include an inductor, such as a telecoil, which may increase transmission speed but may modify the overall impedance of the driver and thus increase level error. Accordingly, the memory device may include a calibration circuit to identify one or more configurations for a set of pull-up circuits and a set of pull-down circuits of the driver (e.g., both with and without an additional inductor).

The calibration circuit may include a pre-amplifier to compare an output of a first pull-up circuit isolated from the additional inductor with one or more reference voltages, compare an output of a second pull-up circuit coupled with the additional inductor with the one or more reference voltages, and compare an output of a pull-down circuit isolated from the additional inductor to the one or more reference voltages. In some examples, the memory device may use the calibration circuit to identify multiple configurations for each pull-up circuit and the pull-down circuit, each configuration corresponding to a first level or a second level of the signal values of the driver. Such circuits and techniques for calibration may allow for an increased non-linearity of the driver, which may improve driver performance (e.g., speed), while maintaining accurate signal levels.

Features of the disclosure are initially described in the context of systems and dies as described with reference to FIG. 1. Features of the disclosure are described in the context eye diagrams, drivers, and circuits as described with reference to FIGS. 2 through 4. These and other features of the disclosure are further illustrated by and described with reference to an apparatus diagram and flowcharts that relate to techniques to configure drivers as described with reference to FIGS. 5 and 6.

FIG. 1 illustrates an example of a system 100 that supports techniques to configure drivers in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controllers 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses).

In some examples, clock signal channels 188 may be operable to communicate one or more clock signals between the host device 105 and the memory device 110. Clock signals may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of a M-ary modulation scheme where M is equal to two. A symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and others.

In some examples, a multi-symbol (or multi-level) modulation scheme may be used to modulate signals communicated between the host device 105 and the memory device 110. A multi-symbol modulation scheme may be an example of a M-ary modulation scheme where M is greater than or equal to three. A symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

A memory device 110 may calibrate a set of drivers at multiple reference voltages corresponding to different signal values (e.g., voltages) of the drivers. In some examples, drivers may include different circuitry for transmitting signals associated with data and signals associated with control information, such as commands, addresses, or both. For example, a driver associated with transmitting data may include an inductor, such as a telecoil, which may increase transmission speed but may modify the overall impedance of the driver and thus increase level error. Accordingly, the memory device 110 may include a calibration circuit to identify one or more configurations for a set of pull-up circuits and a set of pull-down circuits of the driver both with and without the additional inductor. The calibration circuit may include a pre-amplifier to compare an output of a first pull-up circuit isolated from the additional inductor with one or more reference voltages, compare an output of a second pull-up circuit coupled with the additional inductor with the one or more reference voltages, and compare an output of a pull-down circuit isolated from the additional inductor to the one or more reference voltages. In some examples, the memory device 110 may use the calibration circuit to identify multiple configurations for each pull-up circuit and the pull-down circuit, each configuration corresponding to a first level or a second level of the signal values of the driver. Such a circuit and technique for calibration may allow for an increased non-linearity of the driver, which may improve driver performance (e.g., speed), while maintain accurate signal levels.

In addition to applicability in memory devices as described herein, techniques for configuring drivers may be generally implemented to improve the performance (including gaming) of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance electronic devices may be desirable. Implementing the techniques described herein may improve the performance of electronic devices by decreasing linearity of drivers while maintaining signal accuracy, which may decrease processing or latency times, improve response times, or otherwise improve user experience, among other benefits.

Figure 2:
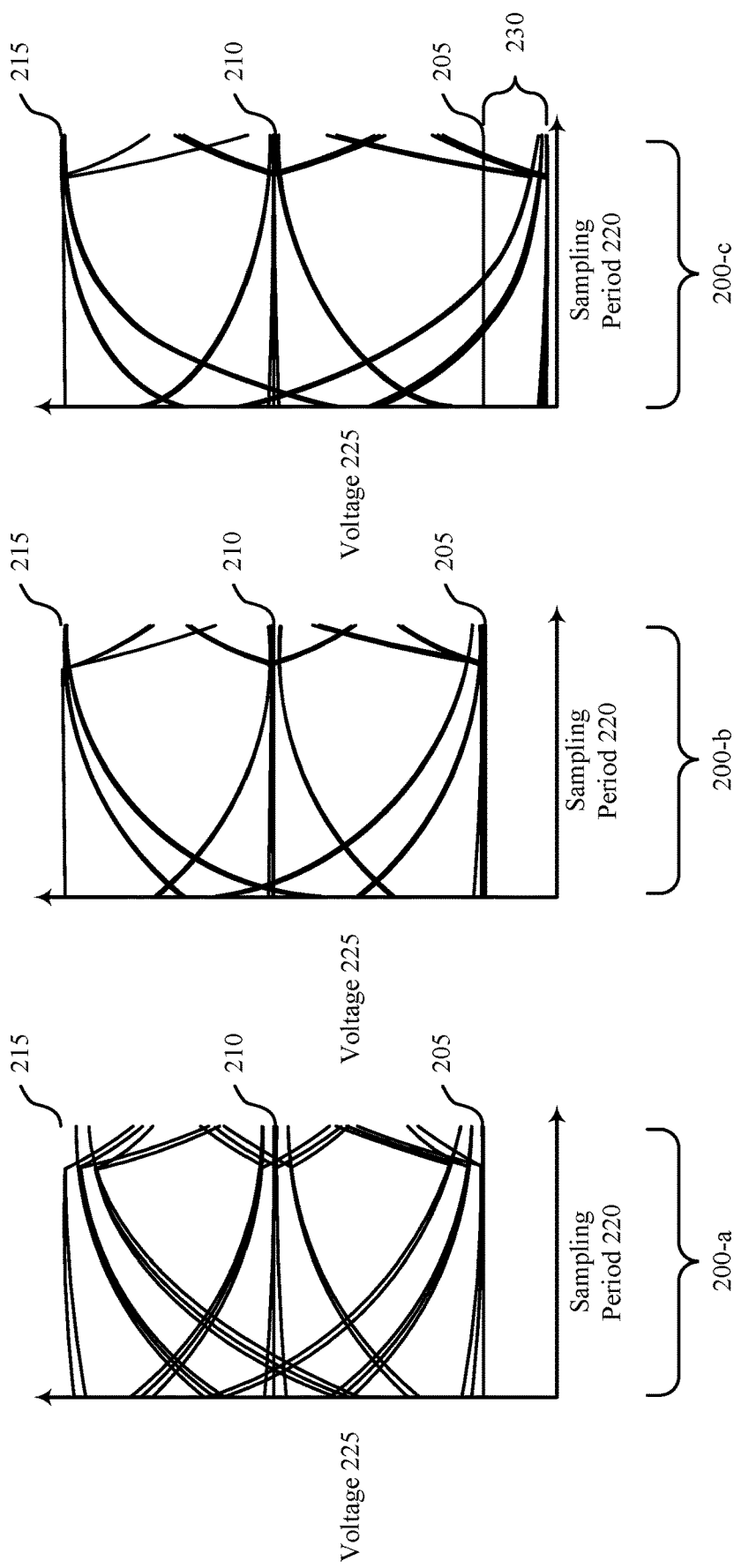
FIG. 2 illustrates an example of eye diagrams that support techniques to configure drivers in accordance with examples as disclosed herein.

FIG. 2 illustrates an example of eye diagrams 200 that support techniques to configure drivers in accordance with examples as disclosed herein. The eye diagrams 200 may be used to indicate the quality of signals in high-speed transmissions and may represent a first level (e.g., a "−1" level), a second level (e.g., a "0" level), and a third level (e.g., a "1" level). In some examples, each of the three levels may be represented by a different voltage amplitude (e.g., amplitudes 205, 210, and 215, respectively). In other examples, the eye diagrams 200 may represent a PAM3 signal that may be used to communicate data associated with a memory device (e.g., a memory device 110 as described with reference to FIG. 1). The eye diagrams 200 may be used to provide a visual indication of the health of the signal integrity, and may indicate speed of data transmission based on rise times of the voltage 225 of a signal, fall times of the voltage 225 of the signal, or both, within a sampling period 220. Additionally, the eye diagrams 200 may illustrate accuracy of transmitted levels, relative to a target level.

To generate the eye diagram 200, an oscilloscope or other device may sample a digital signal according to a sampling period 220 (e.g., a unit interval or a bit period). The sampling period 220 may be defined by a clock associated with the transmission of the measured signal. In some examples, the oscilloscope or other computing device may measure the voltage level of the signal during the sampling period 220 to form a trace. Noise and other factors can result in the traces measured from the signal deviating from a set of ideal step functions. By overlaying a plurality of traces, various characteristics about the measured signal may be determined. For example, the eye diagrams 200 may be used to identify a number of characteristics of a communication signals such as transmission speed, level error, jitter, cross talk, electromagnetic interference (EMI), signal loss, signal-to-noise ratio (SNR), other characteristics, or combinations thereof.

The eye diagram 200-a may be associated with a driver configured with a mitigated or eliminated non-linearity (e.g., an ideal driver, a linear driver). However, because such a linearity of the driver may include an increased capacitance, the transition times (e.g., rise times, fall times, time associated with the driver transitioning between levels) of the signals illustrated in the eye diagram 200-a may also be increased, which may reduce the overall performance (e.g., reduce transmission speed, reduce a data rate of transmission) of the driver.

The eye diagram 200-c may be associated with a driver configured with a relatively greater non-linearity (e.g., relative to the eye diagram 200-a) and may be calibrated using a single reference voltage. Because of the increased non-linearity, the driver associated with the eye diagram 200-c may experience increased performance relative to the driver associated with the eye diagram 200-a. However, the increased non-linearity may also introduce errors in the voltage magnitudes of the driver. For example, if the driver is calibrated using the amplitude 210 (e.g., corresponding to the second level), the driver may transmit a voltage lower than the amplitude 205 when transmitting the first level. That is, the non-linearity may introduce a level error 230 (e.g., a difference between a transmitted voltage for a level and a target voltage for the level), which may lead to "clipping" or other transmission errors.

As discussed herein, a memory device (e.g., a memory device 110 as described with reference to FIG. 1) may configure one or more drivers used to communicate signaling (e.g., signaling between components of the memory device 110, signaling between the memory device 110 and a host device 105) to increase driver performance, mitigate level error, or both, in accordance with the eye diagrams 200. For example, the eye diagram 200-b may be associated with a driver configured with a relatively greater non-linearity (e.g., relative to the eye diagram 200-a) and may be calibrated using a multiple reference voltages. Because of the increased non-linearity, the driver associated with the eye diagram 200-b may experience increased performance relative to the driver associated with the eye diagram 200-a. Additionally, because the driver may be calibrated using multiple reference voltages (e.g., a reference voltage corresponding to the amplitude 210 and a reference voltage corresponding to the amplitude 205), the driver may mitigate or eliminate the level error 230, which may improve overall signal integrity (e.g., by reducing errors associated with clipping or other transmission errors).

The locations of the characteristics of the eye diagram 200 shown in FIG. 2 are for illustrative purposes only. Characteristics such as width, sampling period 220, rise time, fall time, jitter, eye opening, and/or distortion may occur in other parts of the eye diagrams 200 not specifically illustrated in FIG. 2.

Figure 3A:
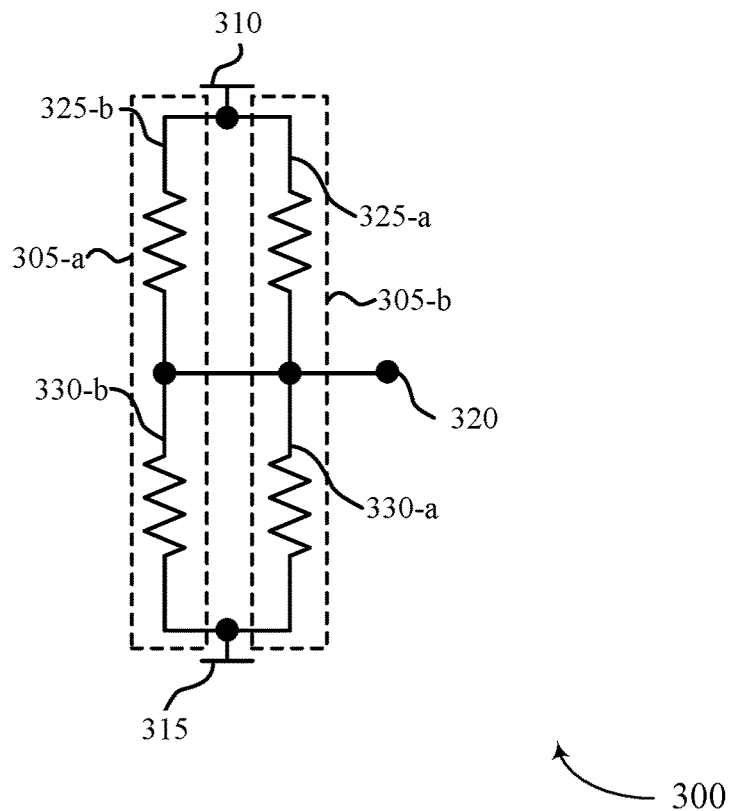
FIGS. 3A and 3B illustrate examples of drivers that support techniques to configure drivers in accordance with examples as disclosed herein.

FIG. 3A illustrates an example of a driver 300 that supports techniques to configure drivers in accordance with examples as disclosed herein. The driver 300 may be implemented within a bus of the memory device, such as the memory device 110. The driver 300 may be an example of a multi-level signaling device (e.g., a PAM3 driver). To support multi-level signaling, the driver 300 may include multiple (e.g., two) pull-down circuits 330 and multiple (e.g., two) pull-up circuits 325, which may be configured to output one of three possible voltage levels (e.g., the first level, the second level, or the third level, as described with reference to FIG. 2) to a conductive line 320 (e.g., a channel, a pin, a terminal). In some examples, the driver 300 may include multiple legs 305, such as the leg 305-a, which may include a pull-up circuit 325-a and a pull-down circuit 330-a, and the leg 305-b, which may include a pull-up circuit 325-b and a pull-down circuit 330-b.

The memory device may be configured to selectively activate each of the pull-up circuits 325 and each of the pull-down circuits 330 to output a particular voltage level on the conductive line 320. Because each pull-up circuit 325 may introduce a respective impedance between the supply voltage source 310 and the conductive line 320, and each pull-down circuit 330 may introduce a respective impedance between the ground voltage source 315 and the conductive line 320, different combinations and quantities of activate pull-up circuits 325 and activated pull-down circuits 330 may output different voltage levels on the conductive line 320. For example, the memory device may calibrate the impedance of each pull-up circuit 325 and each pull-down circuit 330 to achieve the voltage levels.

To output the second level on the conductive line 320, the memory device may activate the pull-down circuit 330-a, which may introduce a first impedance between the conductive line 320 and the ground voltage source 315, and the memory device may activate the pull-up circuit 325-a, which may introduce a second impedance between the conductive line 320 and the supply voltage source 310. Additionally, the memory device may deactivate the pull-down circuit 330-b and the pull-up circuit 325-b, and accordingly output the second level on the conductive line 320.

To output the first level on the conductive line 320, the memory device may activate the pull-down circuit 330-a and the pull-down circuit 330-b, which may introduce a third impedance between the conductive line 320 and the ground voltage source 315. Additionally, the memory device may deactivate the pull-up circuit 325-a and the pull-up circuit 325-b, which may isolate the conductive line 320 from the supply voltage source 310, and accordingly output the first level on the conductive line 320. Because the pull-down circuits 330 may be connected in parallel between the conductive line 320 and the ground voltage source 315, the first impedance may be less than (e.g., half) the third impedance.

To output the third level on the conductive line 320, the memory device may activate the pull-up circuit 325-a and the pull-up circuit 325-b, which may introduce a fourth impedance between the conductive line 320 and the supply voltage source 310. Additionally, the memory device may deactivate the pull-down circuit 330-a and the pull-down circuit 330-b, which may isolate the conductive line 320 from the ground voltage source 315, and output the third level on the conductive line 320. Because the pull-up circuits 325 may be connected in parallel between the conductive line 320 and the supply voltage source 310, the fourth impedance may be less than (e.g., approximately half of) the third impedance.

Figure 3B:
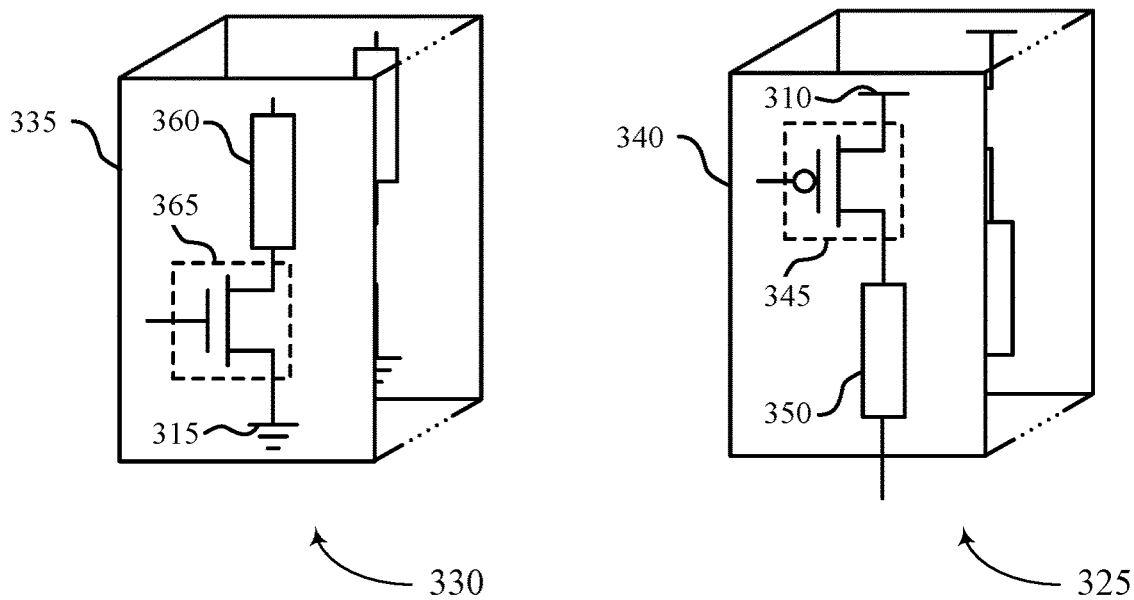

FIG. 3B may illustrate an expanded view of a pull-up circuit 325 and a pull-down circuit 330, which may each support techniques to configure drivers in accordance with examples as disclosed herein. The pull-up circuit 325 may include a quantity of elements 335 (e.g., a quantity of fingers) positioned in parallel between the supply voltage source 310 and an output of the pull-up circuit 325 (e.g., the conductive line 320), and the pull-down circuit 330 may include a quantity of elements 340 positioned in parallel between the ground voltage source 315 and an output of the pull-down circuit 330 (e.g., the conductive line 320). The memory device may configure the quantity of elements 335 and the quantity of elements 340 to achieve a target impedance for the pull-down circuit 330 and a target impedance for the pull-up circuit 325, respectively.

An element 335 of the pull-down circuit 330 may include a transistor 365 (e.g., a pull-down transistor) and a circuit 360 having an impedance based on one or more resistors. The transistor 365 may be an example of an n-type transistor, and may include a first terminal coupled with the ground voltage source 315 and a second terminal coupled with the circuit 360. The circuit 360 may couple (e.g., may be selectively coupled) with the output of the pull-down circuit 330. The transistor 365 may contribute to (e.g., may increase) the non-linearity of the pull-down circuit 330, and the circuit 360 may contribute to the linearization impedance of the pull-down circuit 330. Accordingly, by activating a quantity of transistors 365 of the elements 335, the memory device may calibrate a target impedance, target linearization, or both of the pull-down circuit 330.

An element 340 of the pull-up circuit 325 may include a transistor 345 (e.g., a pull-up transistor) and a circuit 350 having an impedance (e.g., a resistor). The transistor 345 may be an example of a p-type transistor, and may include a first terminal coupled with the supply voltage source 310 and a second terminal coupled with the circuit 350. The circuit 350 may couple with the output of the pull-up circuit 325. The transistor 345 may contribute to (e.g., may increase) the non-linearity of the pull-up circuit 325, and the circuit 350 may contribute to the linearization impedance of the pull-up circuit 325. Accordingly, by activating a quantity of transistors 345 of the elements 340, the memory device may calibrate a target impedance, target linearization, or both of the pull-up circuit 325.

In some examples, the pull-up circuit 325-a and the pull-up circuit 325-b may share a common configuration (e.g., a common quantity of activated elements 340). Alternatively, the pull-up circuit 325-a and the pull-up circuit 325-b may use different configurations (e.g., may be calibrated separately). Additionally, the pull-down circuit 330-a and the pull-down circuit 330-b may share a common configuration (e.g., a common quantity of activated elements 335). Alternatively, the pull-down circuit 330-a and the pull-down circuit 330-b may use different configurations (e.g., may be calibrated separately).

In some examples, the memory device may calibrate the pull-down circuit 330-a, the pull-up circuit 325-a, or both using the second level. For example, as part of a calibration phase, the memory device may modify the quantity of active elements 335 of the pull-down circuit 330-a and may modify the quantity of active elements 340 of the pull-up circuit 325-a to identify a first configuration and achieve a target impedance for the pull-down circuit 330-*a*, the pull-up circuit 325-*a*, or both. Additionally, the memory device may calibrate the pull-down circuit 330-*b* using the first level.

For example, as part of the calibration phase, the memory device may modify the quantity of active elements 335 of the pull-down circuit 330-*b* to identify a second configuration. In some cases, identifying the second configuration may occur after identifying the first configuration, and the second configuration may depend on the first configuration. For example, the second configuration may be selected such that, if the pull-down circuit 330-*a* is configured using the first configuration and the pull-down circuit 330-*b* is configured using the second configuration, the combined impedance (e.g., parallel impedance) of the pull-down circuit 330-*a* and the pull-down circuit 330-*b* allows the driver to achieve the first level. By calibrating the memory device using multiple configurations (e.g., corresponding to multiple signal levels), the driver 300 may employ non-linear impedances, which may improve transmission speed, while mitigating or eliminating transmission errors (e.g., level errors), which may improve overall signal integrity.

Figure 4:
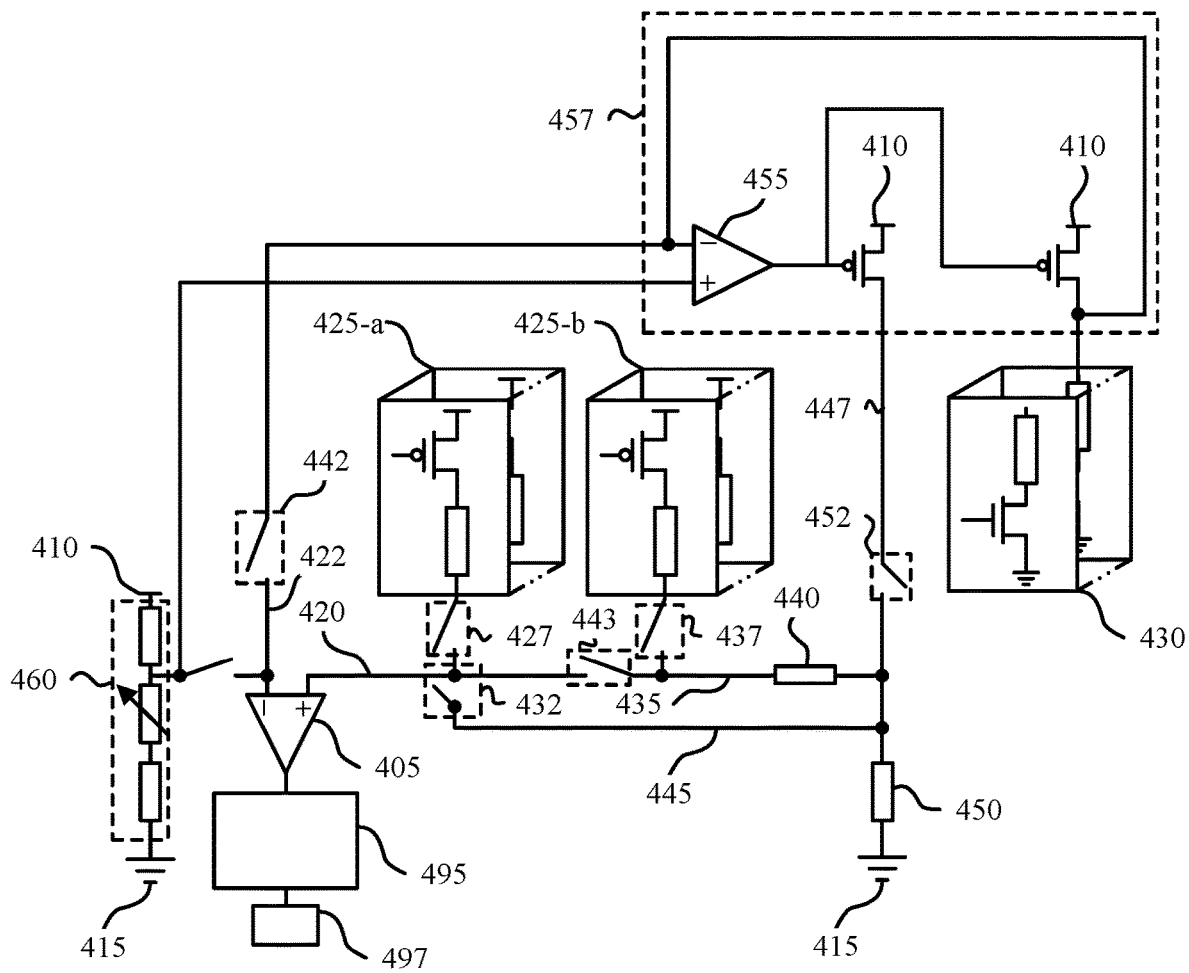
FIG. 4 illustrates an example of a circuit that supports techniques to configure drivers in accordance with examples as disclosed herein.

FIG. 4 illustrates an example of a circuit 400 that supports techniques to configure drivers in accordance with examples as disclosed herein. The circuit 400 may be an example of a calibration circuit, which may support identification of one or more configurations for a driver of a memory device (e.g., the driver 300 as described with reference to FIG. 3A). In some examples, operations associated with identifying the one or more configurations may be performed by or may be supported by a controller of the memory device, such as the device memory controller 155, a local memory controller 165, or both.

The memory device may calibrate the driver using one or more reference voltages corresponding to different signal values of the driver, such as the first level, the second level, and the third level, as described with reference to FIG. 2. The circuit 400 may include an amplifier 405 (e.g., a pre-amplifier) to compare a voltage on a node 420 with a reference voltage on a node 422. The amplifier 405 may output the result of the comparison to a sampler 495 and an output component 497, which may identify a difference between the voltage on the node 420 and the reference voltage on the node 422. For example, the sampler 495 may determine whether the voltage on the node 420 matches (e.g., is equal to, is within a threshold voltage of) the reference voltage on the node 422. In some examples, as part of calibrating the driver, the memory device may calibrate the amplifier 405, an amplifier 455, the sampler 495, or a combination thereof, which may reduce errors associated with measuring components of the circuit 400.

The circuit 400 may include a reference voltage source 460, which may be selectively coupled with the node 422. The reference voltage source 460 may be configured to output one of a set of reference voltages based on a configuration of the reference voltage source 460. For example, the reference voltage source 460 may include one or more circuits having impedance or resistors coupled between a ground voltage source 415 and a supply voltage source 410. Accordingly, the output reference voltage may correspond to a fraction of the supply voltage source.

The memory device may selectively activate or deactivate, according to one or more configurations, different combinations of the circuits to output a particular reference voltage. For example, a first configuration of the reference voltage source 460 may cause the reference voltage source 460 to output a first reference voltage (e.g., 0.6V of the supply voltage source 410), a second configuration of the reference voltage source 460 may cause the reference voltage source 460 to output a second reference voltage (e.g., 0.75V of the supply voltage source 410), and a third configuration of the reference voltage source 460 may cause the reference voltage source 460 to output a third reference voltage (e.g., 0.5V of the supply voltage source 410).

The circuit 400 may include a pull-up circuit 425-*a*, which may be an example of a pull-up circuit 325 as described with reference to FIGS. 3A and 3B. To calibrate the pull-up circuit 425-*a*, the memory device may couple the pull-up circuit 425-*a* with the first node 420, for example by activating a switching component 427, and may concurrently couple the first node 420 with a node 445, for example by activating the switching component 432. In some examples, the node 445 may be coupled with the ground voltage source 415 via a reference circuit 450, which may correspond to an off board reference circuit having a reference impedance value (e.g., 120 ohms). Accordingly, an output voltage of the pull-up circuit 425-*a* may be transmitted to a first input of the amplifier 405.

The memory device may identify a first configuration for the pull-up circuit 425-*a* by configuring the reference voltage source 460 to output the first voltage to the node 422. The amplifier 405 may compare the first voltage with the output voltage of the pull-up circuit 425-*a*, and the memory device may use an output of the amplifier 405 (e.g., via the sampler 495 and the output component 497) to determine whether the output voltage of the pull-up circuit 425-*a* matches the first voltage. The memory device may modify the quantity of active elements of the pull-up circuit 425-*a* such that the output voltage of the pull-up circuit 425-*a* matches the first voltage, and thus identify the first configuration. In some examples, the memory device may determine (e.g., calculate) the impedance of the pull-up circuit 425-*a* calibrated in accordance with the first configuration.

Subsequently, the memory device may identify a second configuration for the pull-up circuit 425-*a* by configuring the reference voltage source 460 to output the second voltage to the node 422. The amplifier 405 may compare the second voltage with the output voltage of the pull-up circuit 425-*a*, and the memory device may use an output of the amplifier 405 (e.g., via the sampler 495 and the output component 497) to determine whether the output voltage of the pull-up circuit 425-*a* matches the second voltage. The memory device may modify the quantity of active elements of the pull-up circuit 425-*a* such that the output voltage of the pull-up circuit 425-*a* matches the second voltage, and thus identify the second configuration. In some examples, the memory device may determine (e.g., calculate) the impedance of the pull-up circuit 425-*a* calibrated in accordance with the second configuration.

The circuit 400 may include a pull-up circuit 425-*b*, which may be an example of a pull-up circuit 325 as described with reference to FIGS. 3A and 3B. To calibrate the pull-up circuit 425-*b*, the memory device may couple the pull-up circuit 425-*b* with the node 435, for example by activating a switching component 437, and may concurrently couple the node 420 with the node 435, for example by activating the switching component 443. In some examples, the node 435 may be coupled with the node 445 via the inductor 440, which may represent a telecoil included in a driver associated with transmitting data. The inductor 440 may increase performance of the driver, but may add impedance (e.g., around 4 ohms), and so a driver associated with transmitting data may operate in accordance with different configurations than the first configuration and the second configuration of the pull-up circuit 425-*a*. Accordingly, an output voltage of the pull-up circuit 425-*b* may be transmitted to the first input of the amplifier 405.

The memory device may identify a first configuration for the pull-up circuit 425-*b* by configuring the reference voltage source 460 to output the first voltage to the node 422. The amplifier 405 may compare the first voltage with the output voltage of the pull-up circuit 425-*b*, and the memory device may use an output of the amplifier 405 (e.g., via the sampler 495 and the output component 497) to determine whether the output voltage of the pull-up circuit 425-*b* matches the first voltage. The memory device may modify the quantity of active elements of the pull-up circuit 425-*b* such that the output voltage of the pull-up circuit 425-*b* matches the first voltage, and thus identify the first configuration. In some examples, the memory device may determine (e.g., calculate) the impedance of the pull-up circuit 425-*b* calibrated in accordance with the first configuration. Additionally, or alternatively, the memory device may determine (e.g., calculate) a value of the impedance of the inductor 440, such as by calculating an equivalent series resistance (ESR) impedance of the inductor 440.

Subsequently, the memory device may identify a second configuration for the pull-up circuit 425-*b* by configuring the reference voltage source 460 to output the second voltage to the node 422. The amplifier 405 may compare the second voltage with the output voltage of the pull-up circuit 425-*b*, and the memory device may use an output of the amplifier 405 (e.g., via the sampler 495 and the output component 497) to determine whether the output voltage of the pull-up circuit 425-*b* matches the second voltage. The memory device may modify the quantity of active elements of the pull-up circuit 425-*b* such that the output voltage of the pull-up circuit 425-*b* matches the second voltage, and thus identify the second configuration. In some examples, the memory device may determine (e.g., calculate) the impedance of the pull-up circuit 425-*b* calibrated in accordance with the second configuration.

The circuit 400 may include a pull-down circuit 430, which may be an example of a pull-down circuit 330 as described with reference to FIGS. 3A and 3B. To calibrate the pull-down circuit 430, the memory device may couple the pull-down circuit 430 with the node 422, for example by activating a switching component 442 and isolating the node 422 from the reference voltage source 460, and may concurrently couple a node 447 with the node 445, for example by activating the switching component 452. In some examples, the circuit 400 may include a regulation loop 457, which may be configured to allow the amplifier 455, the amplifier 405, or both, to compare an output of the pull-down circuit 430 with a reference voltage of the reference voltage source 460.

The memory device may identify a first configuration the pull-down circuit 430 by configuring the reference voltage source 460 to output a third voltage (e.g., 0.5 of the supply voltage) to the amplifier 455. The amplifier 455, the amplifier 405, or both may compare the third voltage with the output voltage of the pull-down circuit 430, and the memory device may use an output of the amplifier 405 (e.g., via the sampler 495 and the output component 497) to determine whether the output voltage of the pull-down circuit 430 matches the third voltage.

The memory device may modify the quantity of active elements of the pull-down circuit 430 such that the output voltage of the pull-down circuit 430 matches the third voltage, and thus identify the first configuration. In some examples, the memory device may determine (e.g., calculate) the impedance of the pull-down circuit 430 calibrated in accordance with the first configuration. Additionally, or alternatively, the memory device may determine a second configuration for the pull-down circuit 430 which incorporates the inductor 440, for example, by using the identified value of the impedance of the inductor 440.

Subsequently, the memory device may identify a third configuration for the pull-down circuit 430 by configuring the reference voltage source 460 to output the second voltage to the amplifier 455. The amplifier 455, the amplifier 405, or both may compare the second voltage with the output voltage of the pull-down circuit 430, and the memory device may use an output of the amplifier 405 (e.g., via the sampler 495 and the output component 497) to determine whether the output voltage of the pull-down circuit 430 matches the second voltage.

The memory device may modify the quantity of active elements of the pull-down circuit 430 such that the output voltage of the pull-up circuit 425-*b* matches the second voltage, and thus identify the third configuration. In some examples, the memory device may determine (e.g., calculate) the impedance of the pull-down circuit 430 calibrated in accordance with the third configuration. Additionally, or alternatively, the memory device may determine a fourth configuration for the pull-down circuit 430 which incorporates the inductor 440, for example by using the identified value of the impedance of the inductor 440.

The memory device may use the identified configurations to operate drivers of the memory device in multiple modes, such as a data transfer mode (e.g., using drivers configured to transmit data), a command transfer mode (e.g., using drivers configured to transmit control information, such as commands, addresses, or both), or both. For example, the memory device may apply the identified configurations to the drivers to transmit the associated voltage levels. Additionally, the memory device may perform calibration multiple times throughout operation. For example, the memory device may perform calibration as part of a power-on initiation (e.g., a boot-up process), in response to change in operating environment, such as a change in temperature, in response to a calibration command, or any combination thereof. By calibrating the memory device using multiple configurations (e.g., corresponding to multiple signal levels), the circuit 400 may operate a driver using non-linear impedances, which may improve transmission speed, while mitigating or eliminating transmission errors (e.g., level errors), which may improve overall signal integrity.

Figure 5:
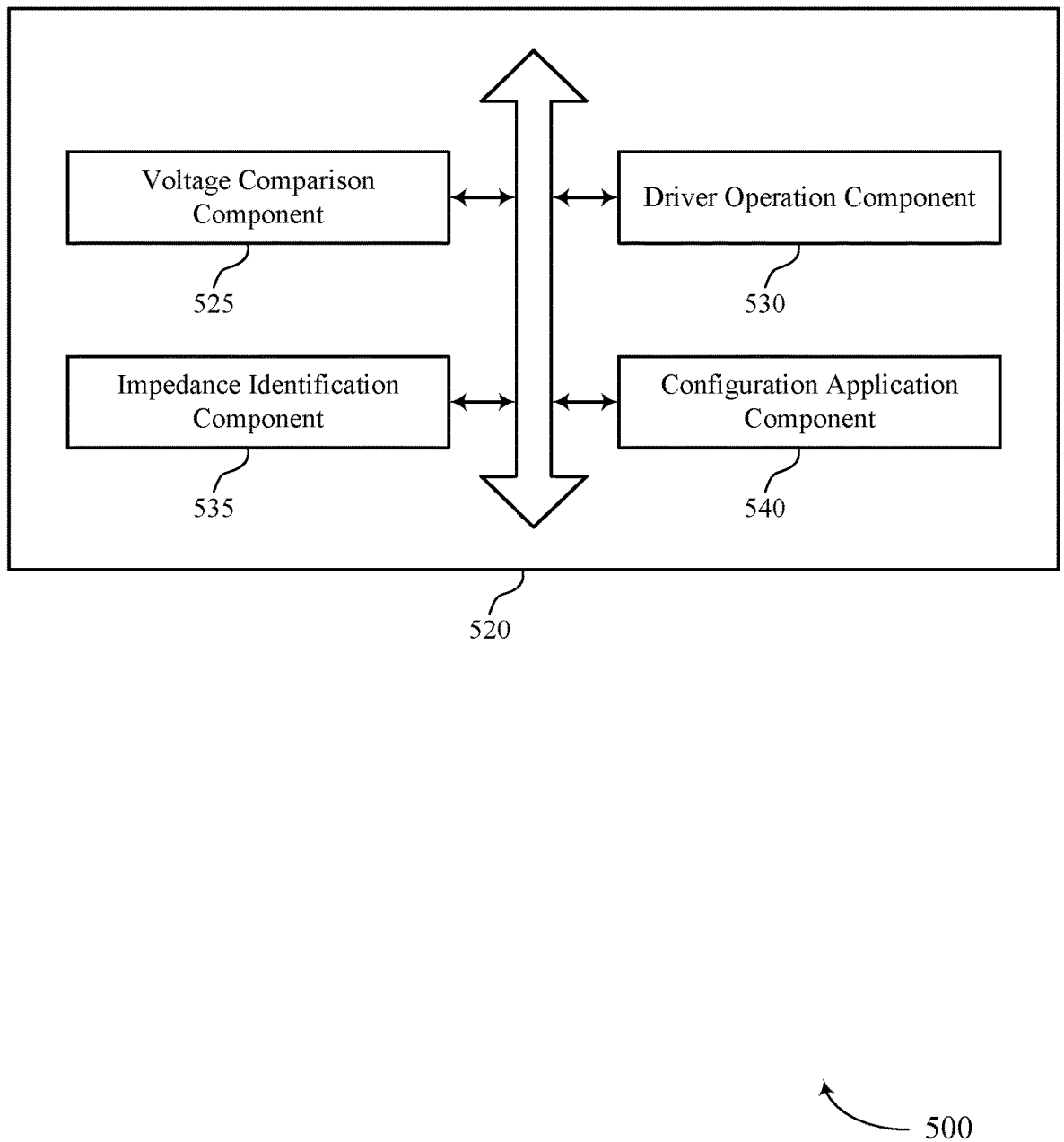
FIG. 5 illustrates a block diagram of a memory device that supports techniques to configure drivers in accordance with examples as disclosed herein.

FIG. 5 illustrates a block diagram 500 of a memory device 520 that supports techniques to configure drivers in accordance with examples as disclosed herein. The memory device 520 may be an example of aspects of a memory device as described with reference to FIGS. 1 through 3. The memory device 520, or various components thereof, may be an example of means for performing various aspects of techniques to configure drivers as described herein. For example, the memory device 520 may include a voltage comparison component 525, a driver operation component 530, an impedance identification component 535, a configuration application component 540, or any combination thereof. Each of these components may communicate, directly or indirectly, with one another (e.g., via one or more buses).

The voltage comparison component 525 may be configured as or otherwise support a means for comparing an output of a first pull-up circuit to a reference voltage of a plurality of reference voltages to identify a first configuration indicating a first impedance of the first pull-up circuit based at least in part on coupling the first pull-up circuit with an amplifier and a ground voltage source. In some examples, the voltage comparison component 525 may be configured as or otherwise support a means for comparing an output of a second pull-up circuit to the reference voltage of a plurality of reference voltages to identify a second configuration indicating a second impedance of the second pull-up circuit based at least in part on coupling the second pull-up circuit with the amplifier and an inductor coupled with the ground voltage source. The driver operation component 530 may be configured as or otherwise support a means for operating a set of drivers of a memory device based at least in part on the first configuration and the second configuration.

In some examples, the voltage comparison component 525 may be configured as or otherwise support a means for comparing a second output of the first pull-up circuit to a second reference voltage different than the reference voltage to identify a third configuration for the first pull-up circuit based at least in part on coupling the first pull-up circuit with the amplifier and the ground voltage source. In some examples, the voltage comparison component 525 may be configured as or otherwise support a means for comparing a second output of the second pull-up circuit to the second reference voltage to identify a fourth configuration for the second pull-up circuit based at least in part on coupling the second pull-up circuit with the amplifier and the inductor coupled with the ground voltage source, where operating the set of drivers is based at least in part on the third configuration and the fourth configuration.

In some examples, the impedance identification component 535 may be configured as or otherwise support a means for determining an impedance of the inductor based at least in part on the output of the second pull-up circuit. In some examples, the voltage comparison component 525 may be configured as or otherwise support a means for comparing an output of a pull-down circuit to the reference voltage and a second reference voltage to identify a fifth configuration and a sixth configuration for the pull-down circuit based at least in part on coupling the pull-down circuit with the amplifier, where the sixth configuration is based at least in part on the impedance of the inductor.

In some examples, to support operating the set of drivers, the configuration application component 540 may be configured as or otherwise support a means for applying, as part of a first mode of operation associated with communicating a command, the first configuration to the set of drivers. In some examples, to support operating the set of drivers, the configuration application component 540 may be configured as or otherwise support a means for applying, as part of a second mode of operation associated with communicating data, the second configuration to the set of drivers.

In some examples, the first pull-up circuit and the second pull-up circuit each include a respective plurality of resistors, each resistor of the respective plurality of resistors selectively coupled with a voltage supply using a respective p-channel transistor.

In some examples, the first configuration indicates a first quantity of resistors of the plurality of resistors of the first pull-up circuit and the second configuration indicates a second quantity of resistors of the plurality of resistors of the second pull-up circuit.

Figure 6:
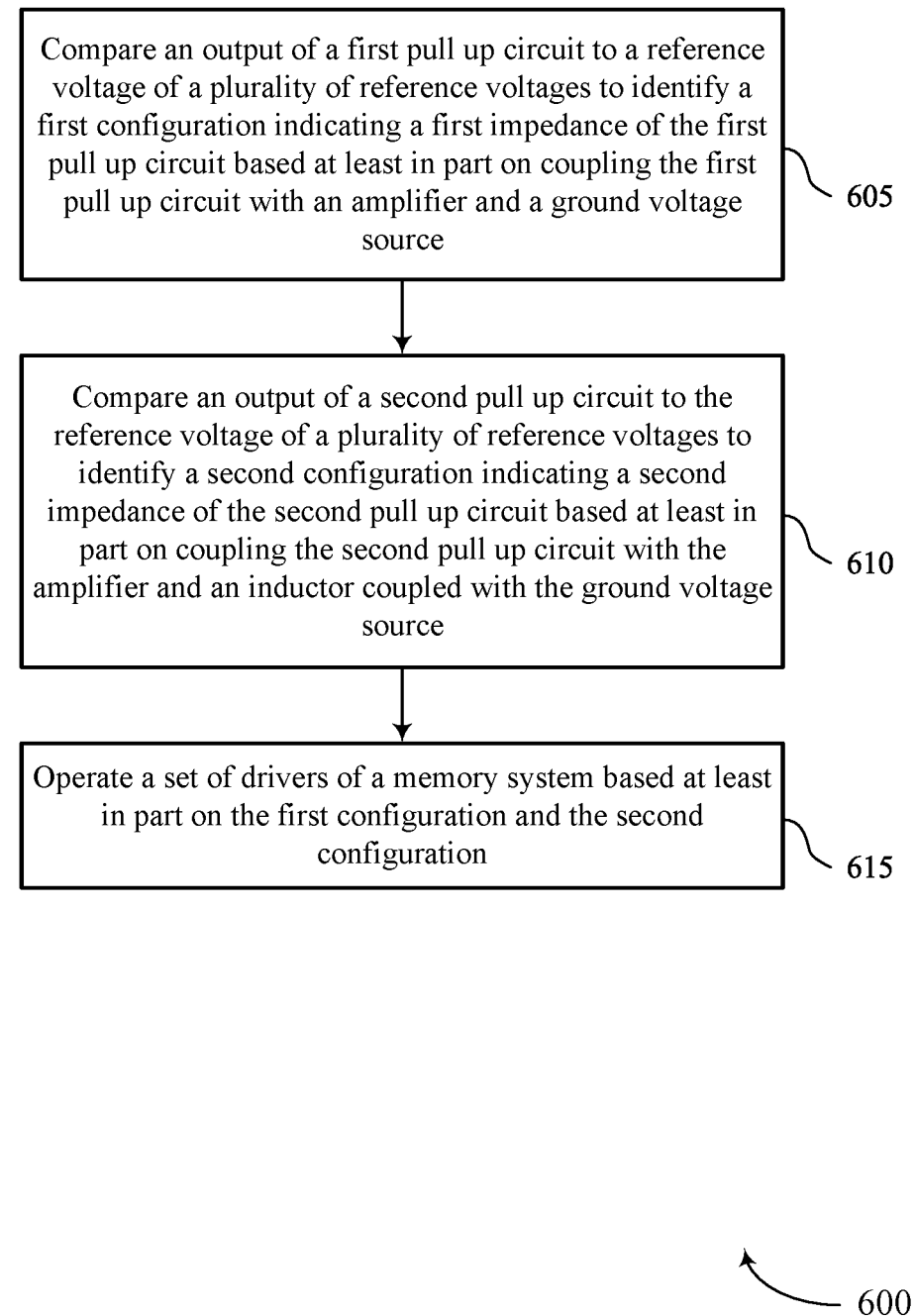
FIG. 6 illustrates a flowchart showing a method or methods that support techniques to configure drivers in accordance with examples as disclosed herein.

FIG. 6 illustrates a flowchart showing a method 600 that supports techniques to configure drivers in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 605, the method may include comparing an output of a first pull-up circuit to a reference voltage of a plurality of reference voltages to identify a first configuration indicating a first impedance of the first pull-up circuit based at least in part on coupling the first pull-up circuit with an amplifier and a ground voltage source. The operations of 605 may be performed in accordance with examples as disclosed herein. In some examples, aspects of the operations of 605 may be performed by a voltage comparison component 525 as described with reference to FIG. 5.

At 610, the method may include comparing an output of a second pull-up circuit to the reference voltage of a plurality of reference voltages to identify a second configuration indicating a second impedance of the second pull-up circuit based at least in part on coupling the second pull-up circuit with the amplifier and an inductor coupled with the ground voltage source. The operations of 610 may be performed in accordance with examples as disclosed herein. In some examples, aspects of the operations of 610 may be performed by a voltage comparison component 525 as described with reference to FIG. 5.

At 615, the method may include operating a set of drivers of a memory device based at least in part on the first configuration and the second configuration. The operations of 615 may be performed in accordance with examples as disclosed herein. In some examples, aspects of the operations of 615 may be performed by a driver operation component 530 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for comparing an output of a first pull-up circuit to a reference voltage of a plurality of reference voltages to identify a first configuration indicating a first impedance of the first pull-up circuit based at least in part on coupling the first pull-up circuit with an amplifier and a ground voltage source; comparing an output of a second pull-up circuit to the reference voltage of a plurality of reference voltages to identify a second configuration indicating a second impedance of the second pull-up circuit based at least in part on coupling the second pull-up circuit with the amplifier and an inductor coupled with the ground voltage source; and operating a set of drivers of a memory device based at least in part on the first configuration and the second configuration.

Aspect 2: The method, apparatus, or non-transitory computer-readable medium of aspect 1, further including operations, features, circuitry, logic, means, or instructions, or any combination thereof for comparing a second output of the first pull-up circuit to a second reference voltage different than the reference voltage to identify a third configuration for the first pull-up circuit based at least in part on coupling the first pull-up circuit with the amplifier and the ground voltage source and comparing a second output of the second pull-up circuit to the second reference voltage to identify a fourth configuration for the second pull-up circuit based at least in part on coupling the second pull-up circuit with the amplifier and the inductor coupled with the ground voltage source, where operating the set of drivers is based at least in part on the third configuration and the fourth configuration.

Aspect 3: The method, apparatus, or non-transitory computer-readable medium of any of aspects 1 through 2, further including operations, features, circuitry, logic, means, or instructions, or any combination thereof for determining an impedance of the inductor based at least in part on the output of the second pull-up circuit and comparing an output of a pull-down circuit to the reference voltage and a second reference voltage to identify a fifth configuration and a sixth configuration for the pull-down circuit based at least in part on coupling the pull-down circuit with the amplifier, where the sixth configuration is based at least in part on the impedance of the inductor.

Aspect 4: The method, apparatus, or non-transitory computer-readable medium of any of aspects 1 through 3, where operating the set of drivers includes operations, features, circuitry, logic, means, or instructions, or any combination thereof for applying, as part of a first mode of operation associated with communicating a command, the first configuration to the set of drivers and applying, as part of a second mode of operation associated with communicating data, the second configuration to the set of drivers.

Aspect 5: The method, apparatus, or non-transitory computer-readable medium of any of aspects 1 through 4, where the first pull-up circuit and the second pull-up circuit each include a respective plurality of resistors, each resistor of the respective plurality of resistors selectively coupled with a voltage supply using a respective p-channel transistor.

Aspect 6: The method, apparatus, or non-transitory computer-readable medium of aspect 5, where the first configuration indicates a first quantity of resistors of the plurality of resistors of the first pull-up circuit and the second configuration indicates a second quantity of resistors of the plurality of resistors of the second pull-up circuit.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 7: An apparatus, including: an amplifier including a first input coupled with a first node, the first node selectively coupled with a second node; a first pull-up circuit configured to be selectively coupled with the first node, the amplifier configured to compare an output of the first pull-up circuit with a first reference voltage of a plurality of reference voltages and a second reference voltage of the plurality of reference voltages; a second pull-up circuit configured to be selectively coupled with a third node, the third node selectively coupled with the first node; and an inductor configured to couple the second node with the third node, the amplifier further configured to compare an output of the second pull-up circuit and the inductor with the first reference voltage and the second reference voltage.

Aspect 8: The apparatus of aspect 7, where the second node is coupled with a ground voltage source.

Aspect 9: The apparatus of aspect 8, further including: a circuit having an impedance, the circuit configured to couple the second node with the ground voltage source.

Aspect 10: The apparatus of any of aspects 7 through 9, where the first pull-up circuit and the second pull-up circuit each include a respective plurality of resistors, each resistor of the respective plurality of resistors selectively coupled with a voltage supply using a respective p-channel transistor.

Aspect 11: The apparatus of any of aspects 7 through 10, further including: a fourth node coupled with a second input of the amplifier, the fourth node selectively coupled with a reference voltage source.

Aspect 12: The apparatus of aspect 11, further including: a second amplifier including a first input coupled with the reference voltage source and a second input selectively coupled with the fourth node.

Aspect 13: The apparatus of aspect 12, further including: a pull-down circuit coupled with the second input of the second amplifier and selectively coupled with a first voltage source based at least in part on an output of the second amplifier.

Aspect 14: The apparatus of aspect 13, where the pull-down circuit includes a plurality of resistors, each resistor of the plurality of resistors selectively coupled with a ground voltage source using a respective n-channel transistor.

Aspect 15: The apparatus of any of aspects 12 through 14, where the second node is selectively coupled with a second voltage source based at least in part on an output of the second amplifier.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   an amplifier comprising a first input coupled with a first node, the first node selectively coupled with a second node;
   a first pull-up circuit configured to be selectively coupled with the first node, the amplifier configured to compare an output of the first pull-up circuit with a first reference voltage of a plurality of reference voltages and a second reference voltage of the plurality of reference voltages;
   a second pull-up circuit configured to be selectively coupled with a third node, the third node selectively coupled with the first node; and
   an inductor configured to couple the second node with the third node, the amplifier further configured to compare an output of the second pull-up circuit and the inductor with the first reference voltage and the second reference voltage.

2. The apparatus of claim 1, wherein the second node is coupled with a ground voltage source.

3. The apparatus of claim 2, further comprising:
   a circuit having an impedance, the circuit configured to couple the second node with the ground voltage source.

4. The apparatus of claim 1, wherein the first pull-up circuit and the second pull-up circuit each comprise a respective plurality of resistors, each resistor of the respective plurality of resistors selectively coupled with a voltage supply using a respective p-channel transistor.

5. The apparatus of claim 1, further comprising:
   a fourth node coupled with a second input of the amplifier, the fourth node selectively coupled with a reference voltage source.

6. The apparatus of claim 5, further comprising:
   a second amplifier comprising a first input coupled with the reference voltage source and a second input selectively coupled with the fourth node.

7. The apparatus of claim 6, further comprising:
   a pull-down circuit coupled with the second input of the second amplifier and selectively coupled with a first voltage source based at least in part on an output of the second amplifier.

8. The apparatus of claim 7, wherein the pull-down circuit comprises a plurality of resistors, each resistor of the plurality of resistors selectively coupled with a ground voltage source using a respective n-channel transistor.

9. The apparatus of claim 6, wherein the second node is selectively coupled with a second voltage source based at least in part on an output of the second amplifier.

10. A method, comprising:
    comparing an output of a first pull-up circuit to a reference voltage of a plurality of reference voltages to identify a first configuration indicating a first impedance of the first pull-up circuit based at least in part on coupling the first pull-up circuit with an amplifier and a ground voltage source;
    comparing an output of a second pull-up circuit to the reference voltage of the plurality of reference voltages to identify a second configuration indicating a second impedance of the second pull-up circuit based at least in part on coupling the second pull-up circuit with the amplifier and an inductor coupled with the ground voltage source; and
    operating a set of drivers of a memory device based at least in part on the first configuration and the second configuration.

11. The method of claim 10, further comprising:
    comparing a second output of the first pull-up circuit to a second reference voltage different than the reference voltage to identify a third configuration for the first pull-up circuit based at least in part on coupling the first pull-up circuit with the amplifier and the ground voltage source; and
    comparing a second output of the second pull-up circuit to the second reference voltage to identify a fourth configuration for the second pull-up circuit based at least in part on coupling the second pull-up circuit with the amplifier and the inductor coupled with the ground voltage source, wherein operating the set of drivers is based at least in part on the third configuration and the fourth configuration.

12. The method of claim 10, further comprising:
    determining an impedance of the inductor based at least in part on the output of the second pull-up circuit; and
    comparing an output of a pull-down circuit to the reference voltage and a second reference voltage to identify a fifth configuration and a sixth configuration for the pull-down circuit based at least in part on coupling the pull-down circuit with the amplifier, wherein the sixth configuration is based at least in part on the impedance of the inductor.

13. The method of claim 10, wherein operating the set of drivers comprises:
    applying, as part of a first mode of operation associated with communicating a command, the first configuration to the set of drivers; and
    applying, as part of a second mode of operation associated with communicating data, the second configuration to the set of drivers.

14. The method of claim 10, wherein the first pull-up circuit and the second pull-up circuit each comprise a respective plurality of resistors, each resistor of the respective plurality of resistors selectively coupled with a voltage supply using a respective p-channel transistor.

15. The method of claim 14, wherein the first configuration indicates a first quantity of resistors of the respective plurality of resistors of the first pull-up circuit and the second configuration indicates a second quantity of resistors of the respective plurality of resistors of the second pull-up circuit.

16. An apparatus, comprising: a controller associated with a memory device, wherein the controller is configured to cause the apparatus to:
compare an output of a first pull-up circuit to a reference voltage of a plurality of reference voltages to identify a first configuration indicating a first impedance of the first pull-up circuit based at least in part on coupling the first pull-up circuit with an amplifier and a ground voltage source;
compare an output of a second pull-up circuit to the reference voltage of the plurality of reference voltages to identify a second configuration indicating a second impedance of the second pull-up circuit based at least in part on coupling the second pull-up circuit with the amplifier and an inductor coupled with the ground voltage source; and
operate a set of drivers of the memory device based at least in part on the first configuration and the second configuration.

17. The apparatus of claim 16, wherein the controller is further configured to cause the apparatus to:
compare a second output of the first pull-up circuit to a second reference voltage different than the reference voltage to identify a third configuration for the first pull-up circuit based at least in part on coupling the first pull-up circuit with the amplifier and the ground voltage source; and
compare a second output of the second pull-up circuit to the second reference voltage to identify a fourth configuration for the second pull-up circuit based at least in part on coupling the second pull-up circuit with the amplifier and the inductor coupled with the ground voltage source, wherein operating the set of drivers is based at least in part on the third configuration and the fourth configuration.

18. The apparatus of claim 16, wherein the controller is further configured to cause the apparatus to:
determine an impedance of the inductor based at least in part on the output of the second pull-up circuit; and
compare an output of a pull-down circuit to the reference voltage and a second reference voltage to identify a fifth configuration and a sixth configuration for the pull-down circuit based at least in part on coupling the pull-down circuit with the amplifier, wherein the sixth configuration is based at least in part on the impedance of the inductor.

19. The apparatus of claim 16, wherein operating the set of drivers is configured to cause the apparatus to:
apply, as part of a first mode of operation associated with communicating a command, the first configuration to the set of drivers; and
apply, as part of a second mode of operation associated with communicating data, the second configuration to the set of drivers.

20. The apparatus of claim 16, wherein the first pull-up circuit and the second pull-up circuit each comprise a respective plurality of resistors, each resistor of the respective plurality of resistors selectively coupled with a voltage supply using a respective p-channel transistor.

* * * * *